March 22, 1932.    E. BUGATTI    1,850,259
SUSPENSION ARRANGEMENT FOR VEHICLES
Filed May 6, 1927    3 Sheets-Sheet 1

Inventor
Ettore Bugatti
By Cameron, Kerkam & Sutton,
Attorneys.

March 22, 1932.  E. BUGATTI  1,850,259

SUSPENSION ARRANGEMENT FOR VEHICLES

Filed May 6, 1927  3 Sheets-Sheet 2

Inventor
Ettore Bugatti
By Cameron, Kerkam & Sutton,
Attorneys.

March 22, 1932.   E. BUGATTI   1,850,259
SUSPENSION ARRANGEMENT FOR VEHICLES
Filed May 6, 1927   3 Sheets-Sheet 3
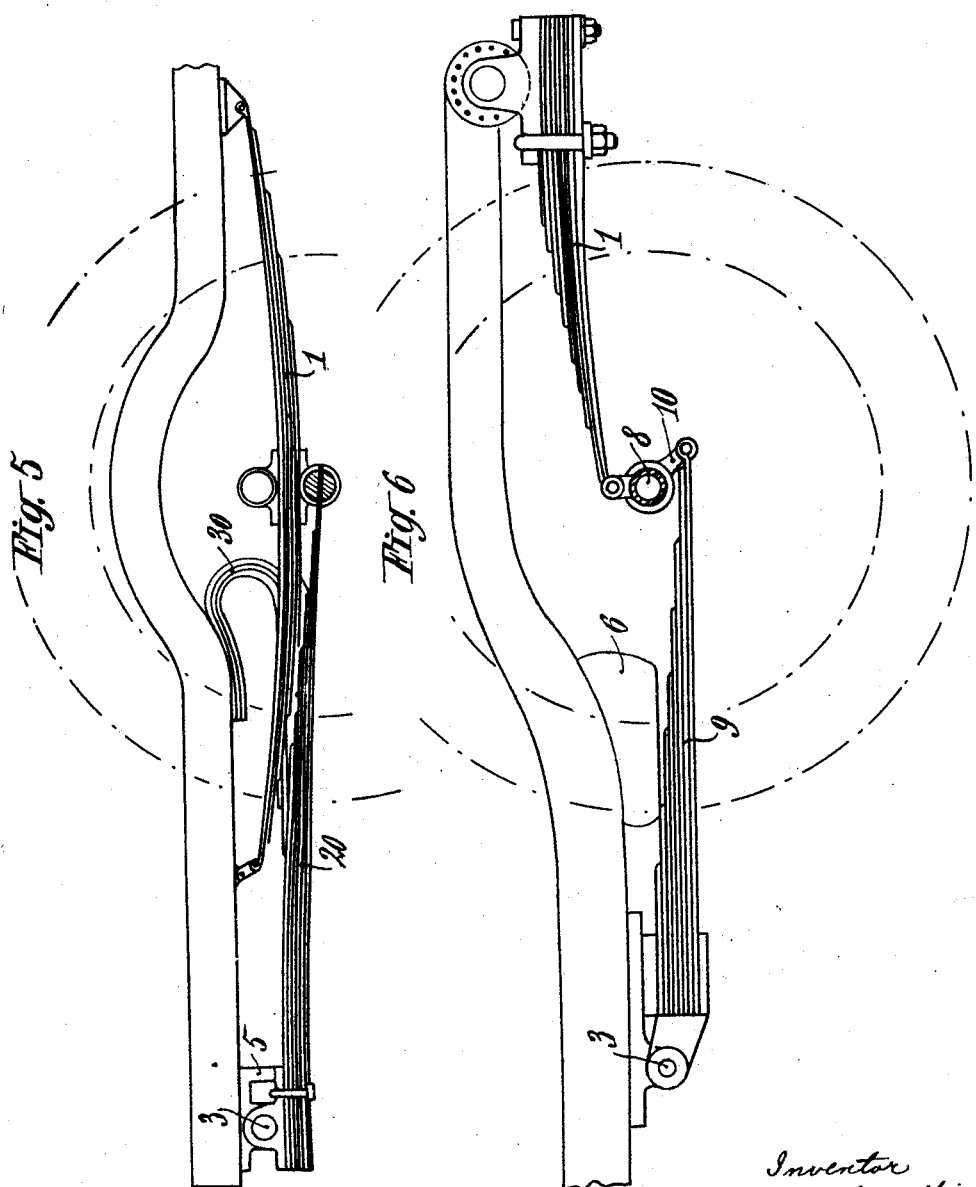

Patented Mar. 22, 1932

1,850,259

UNITED STATES PATENT OFFICE

ETTORE BUGATTI, OF MOLSHEIM, FRANCE

SUSPENSION ARRANGEMENT FOR VEHICLES

Application filed May 6, 1927, Serial No. 189,401, and in France May 18, 1926.

The suspensions in current use upon motor vehicles and the like consists as a rule of one or more springs which are connected at one end with the vehicle frame and at the other with the front or rear axle, the springs being connected with the said frame by stationary means or by shackles.

Due to the great variety of forms and dispositions of such springs, no complete description of the same will be attempted. In all cases, the work is identical. If there is an obstacle on the road, either projecting or sunken, the wheel rises rapidly, flattens the spring, and draws with it the vehicle frame which continues its upward motion. When the wheel has cleared the obstacle it will be abruptly brought upon the ground by the motion of the spring which has been flattened by the shock. This rapid descent of the wheel is often termed a racket stroke, and this motion is more abrupt as the vehicle travels at a higher speed. Before the vehicle returns to the normal, there will be produced a set of oscillations which are longer as the suspension is easier and softer.

To obviate such rapid and abrupt motion and oscillations, the suspension often comprises shock absorbers which exercise a braking action upon the rise and descent (or the descent alone) of the axle with reference to the vehicle frame, but the disadvantage of this arrangement consists in the fact that the absorber will always brake the parts with the same force, thus acting with the same power for a large and abrupt shock or a small shock.

It is therefore desirable to employ a progressive suspension in which the effort required for the flattening of the spring will increase as the action continues, and this is the object of the present invention, in which there is disposed between the spring and the vehicle a suitable elastic mass or spring, the suspension spring being disposed for a downward pivoting motion in such manner that the vehicle axle is not suspended from the frame and that the wheels will never rise from the ground.

The following description with reference to the appended drawings sets forth the manner in which the said invention is carried into effect.

Fig. 1ᵇ is a separate view of the forked bracket.

Fig. 5 shows a suspension comprising a half-elliptical supporting spring and a quarter-elliptical braking spring.

Fig. 6 is a construction similar to Figs. 1, 2, 3 and 4, but comprising a quarter-elliptical braking spring.

Figure 1:
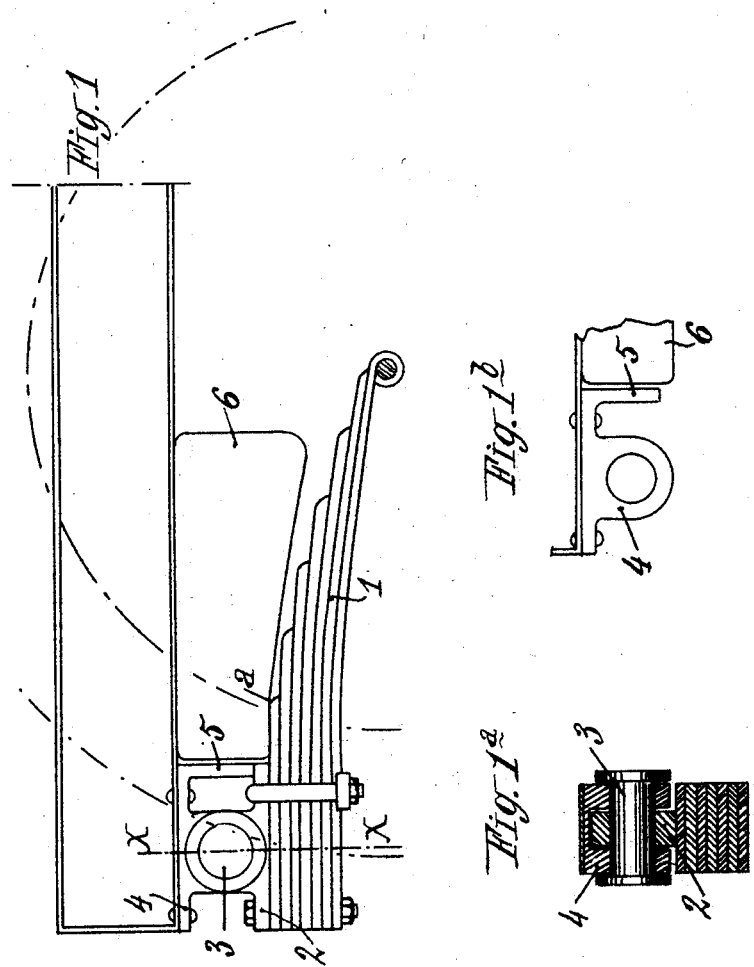
Figs. 1 and 2 show a construction in which a rubber member is employed for the progressive braking, and Fig. 1ª is a section on the line X—X of Fig. 1.

In the device shown in Fig. 1, the suspension consists of a quarter of an elliptical spring 1 attached at one end to a member 2 which is rotatable on a pin 3 supported by a forked bracket 4 provided with an abutment 5 which prevents the member 2 from exceeding a certain position after which the spring will commence to operate. To increase the elastic load of the spring at each instant, there is interposed between the vehicle frame and the spring 1 an elastic mass 6, and when it is flattened it will set up a force of reaction which increases until equilibrium is obtained.

With this arrangement, the motion assumed by a point of the spring is a motion which is retarded in a practically uniform manner and which ceases when in the position of equilibrium. The stress imparted to bring the wheel to the ground will be very great at first, and it then diminishes by degrees and becomes null at the time when the spring begins to pivot on the axis 3 and leaves the abutment 5. The wheel then remains on the ground and the frame progressively assumes its initial position relatively to the spring, this motion taking place without shocks and with an easy effect.

Figure 2:
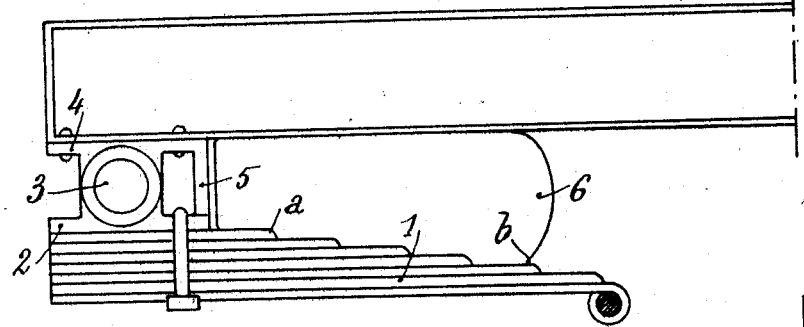

Fig. 2 shows the position of the spring when flattened after a shock received by the wheel. The said elastic mass, instead of bearing at a single point $a$ will bear upon a great length $a$—$b$, thus reducing the bending moment, as above stated.

Figure 3:
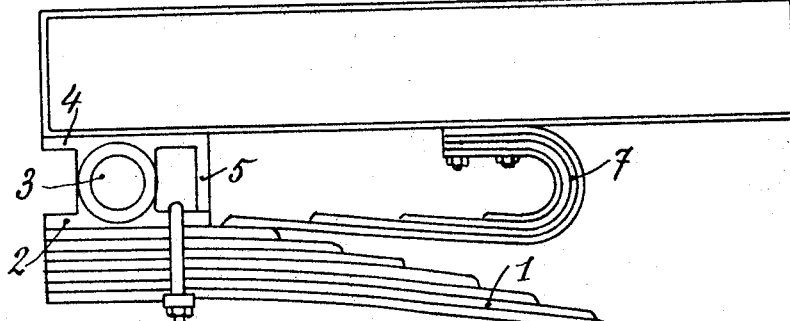
Figs. 3 and 4 show a construction in which a spring serves for the progressive braking.
Figure 4:
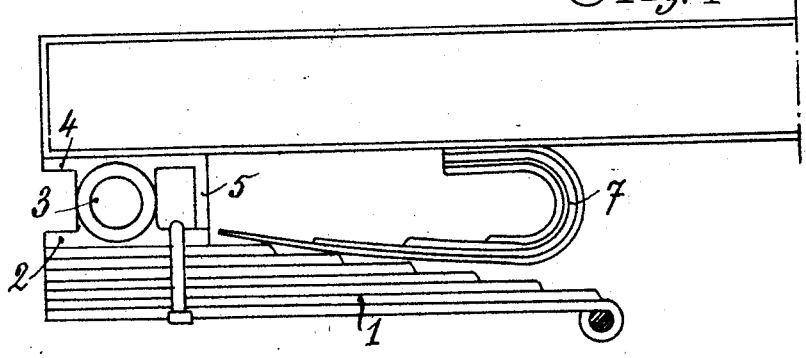

Figs. 3 and 4 show respectively in the initial position and in the flattened position a suspension device similar to the preceding, but herein the elastic mass 6 is replaced by a spring 7 so disposed that when the spring 1 is flattened, it will make contact with a point on the absorbing spring 7 which is less and less elastic, whereby the bending moment will be diminished.

Fig. 5 shows a suspension arrangement known per se, comprising a semi-elliptical spring, to which is herein added a quarter-elliptical spring 20 pivotally mounted on the axle 3 adapted for progressive braking, to which is added the absorbing spring 30. It is obvious that these three springs need not be situated in the same plane and that the springs 20 and 30 may be situated at the front or the rear of the spring 1.

Fig. 6 is a suspension comprising a quarter-elliptical spring secured to the rear of the vehicle frame and extending towards the front, the front part being connected with the vehicle axle 8 to be suspended; the absorbing spring 9 is pivotally mounted on the axle pin 3 which is secured to the vehicle frame. The outer end of the spring 9 is secured to the axle 8 by a forked bracket 10 rotatable on the vehicle axle 8; said bracket may be replaced by a shackle such as is commonly employed for connecting the springs with the frame. The spring 9 will be progressively braked by an elastic mass 6 as shown in the figure or by a spring as in the preceding case. To obviate all shocks between the members 2 of the suspension spring 1 and the abutment 5, it is simply necessary that the preliminary tension load of the elastic mass 6 or of the spring 7 shall exceed or shall at least equal the weight supported by the spring 1 at this point, and this weight is about equal to one fourth the total weight of the vehicle.

What I claim is:

1. A suspension for vehicles comprising a spring pivotally mounted at one end on the vehicle frame and carrying at the other end the wheel axle, and an elastic abutment mounted on the vehicle frame between said frame and the spring and adapted to come in contact with a gradually increasing portion of the spring as the same is being compressed.

2. A suspension for vehicles comprising a spring pivotally mounted at one end on the vehicle frame and carrying at the other end the wheel axle, and an elastic wedge-shaped mass mounted on the vehicle frame between said frame and the spring and adapted to come in contact with a gradually increasing length of the spring as the same is compressed by an upward motion of the wheel.

3. A suspension for vehicles comprising a spring pivotally mounted at one end on the vehicle frame and carrying at the other end the wheel axle, and a spring abutment mounted on the vehicle frame between said frame and the spring and adapted to come in contact with a gradually increasing length of the spring as the same is compressed by an upward motion of the wheel.

4. A suspension device for vehicles comprising a spring, means for suspending the said spring from the vehicle frame while allowing it to pivot on a horizontal pin, an abutment limiting the oscillation of said spring on the said horizontal pin, an elastic device interposed between the spring and the vehicle frame and so disposed that the said spring will make contact therewith during its upward motion, in such manner that this motion will be braked while at the same time the bending moment of the spring will be diminished.

5. A suspension device for vehicles comprising a spring, means for suspending said spring from the vehicle frame while allowing it to pivot on a horizontal pin, a plate spring which is secured at one end to the vehicle frame, said spring being curved in the form of a half-loop and its other end being adapted to make contact at a point near the center of the said suspension spring, in such manner that when the suspension spring is bent it will make contact with the said half-loop spring which will progressively brake the upward motion and will diminish the bending moment.

6. A suspension for vehicles comprising a spring, means for suspending the said spring from the vehicle frame while allowing it to pivot on a horizontal axle, an abutment limiting the oscillation of said spring on said horizontal axle, an elastic wedge-shaped mass interposed between the spring and the vehicle frame and so disposed that said spring will come in contact therewith during its upward motion, in such manner that this motion will be braked while at the same time the bending moment of the spring will be gradually decreased during this motion.

7. A suspension device for vehicles comprising a spring, means for pivotally suspending the said spring from the vehicle frame, an elastic device interposed between the spring and the vehicle frame and so disposed that the said spring will make contact therewith during its upward motion, in such manner that this motion will be braked while at the same time the bending moment of the spring will be diminished.

In testimony whereof I have signed this specification.

ETTORE BUGATTI.